United States Patent

Gogan

[15] 3,680,817
[45] Aug. 1, 1972

[54] MULTI-WAY CABLE TROUGHS
[72] Inventor: James E. Gogan, Islington, Ontario, Canada
[73] Assignee: Electrovert Ltd., Montreal, Quebec, Canada
[22] Filed: Nov. 28, 1969
[21] Appl. No.: 880,699

[52] U.S. Cl. ................................................. 248/68
[51] Int. Cl. ............................ H02g 3/04, F16l 3/22
[58] Field of Search ....... 248/68, 49, 58; 52/490, 495

[56] References Cited

UNITED STATES PATENTS

| | | | |
|---|---|---|---|
| 2,399,151 | 4/1946 | Tickle | 52/493 X |
| 2,620,751 | 12/1952 | Watter | 52/490 |
| 3,022,972 | 2/1962 | Bunston | 248/62 |
| 3,137,468 | 6/1964 | Meinders | 248/68 X |
| 3,210,035 | 10/1965 | Vincens | 248/188.8 |
| 3,406,932 | 10/1968 | Burke | 248/68 |
| 3,521,843 | 7/1970 | Ogle | 248/58 |

FOREIGN PATENTS OR APPLICATIONS 1,457,364  9/1966  France .......................... 248/49

Primary Examiner—Chancellor E. Harris
Attorney—J. Noel Walton

[57] ABSTRACT

This invention relates to ladder-type troughs for supporting electric cables, which troughs are adapted to receive and support cable-supporting modular panels of both ventilated and non-ventilated constructions. The troughs are formed with a pair of longitudinally parallel and upstanding side flanges which are mutually separated and rigidly interconnected by a plurality of longitudinally separated and transversely extending ribs. Means are provided for supporting the modular panels between the ribs so that the cable-supporting surfaces of such panels are substantially coplanar with the cable-supporting surfaces of the ribs.

14 Claims, 9 Drawing Figures

PATENTED AUG 1 1972 3,680,817
SHEET 1 OF 2
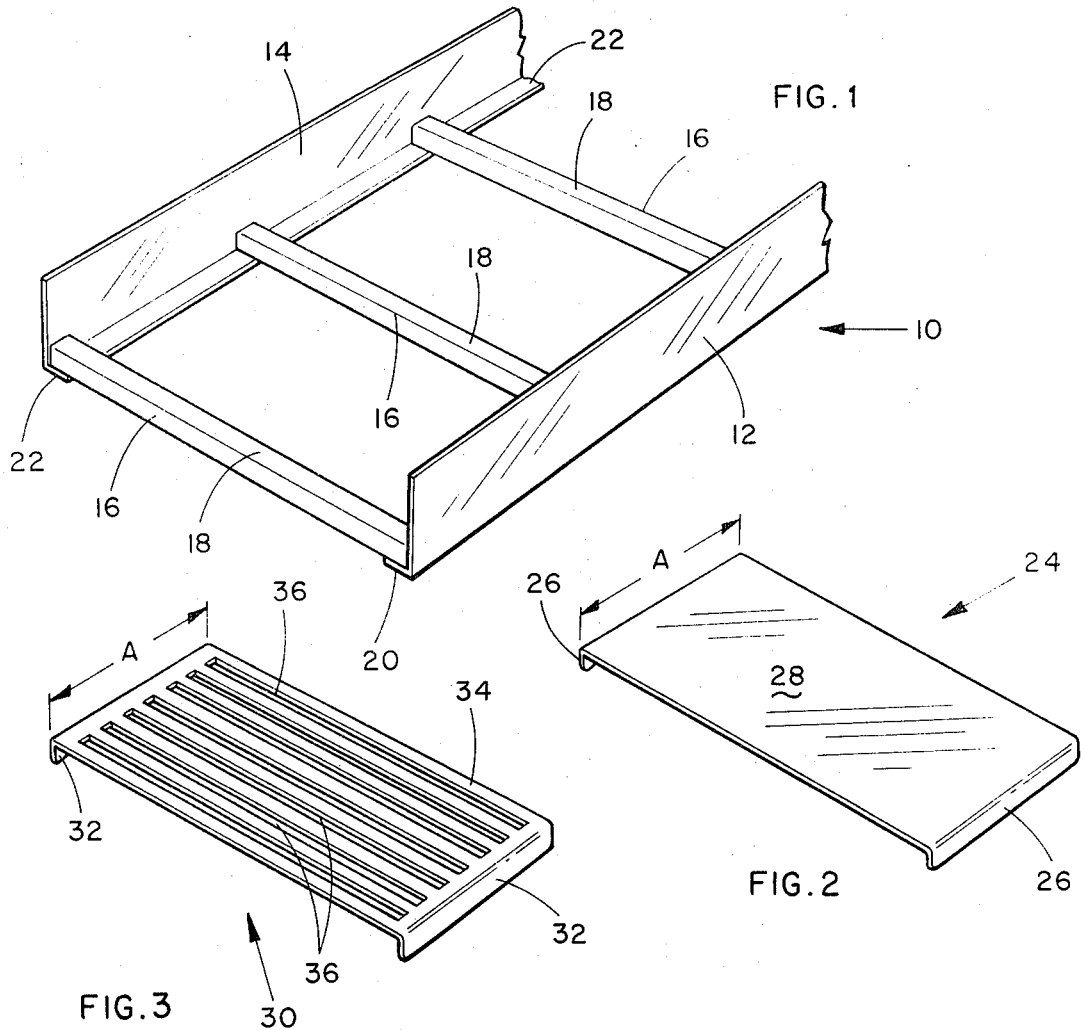
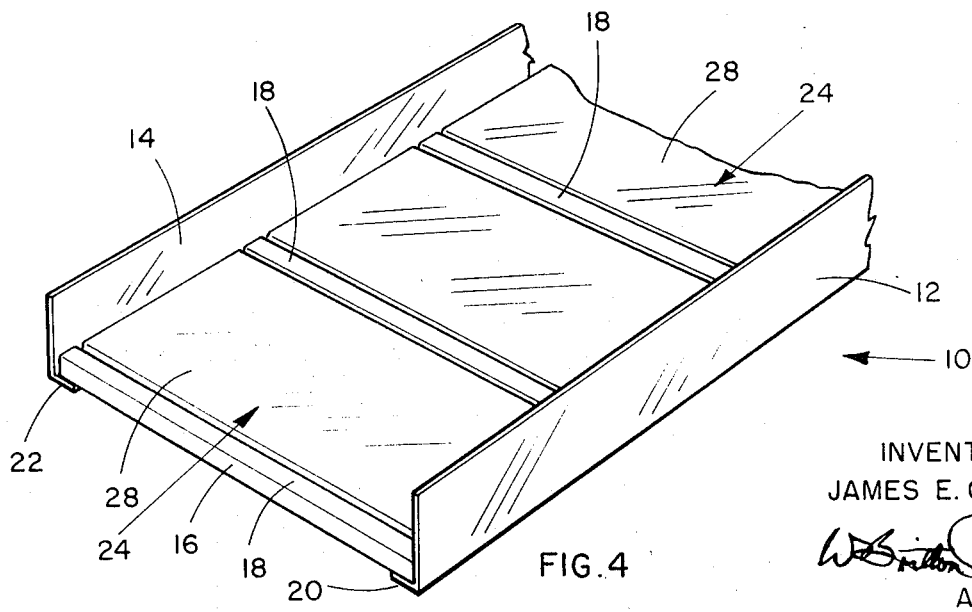
INVENTOR
JAMES E. GOGAN
ATTORNEY PATENTED AUG 1 1972 3,680,817
SHEET 2 OF 2
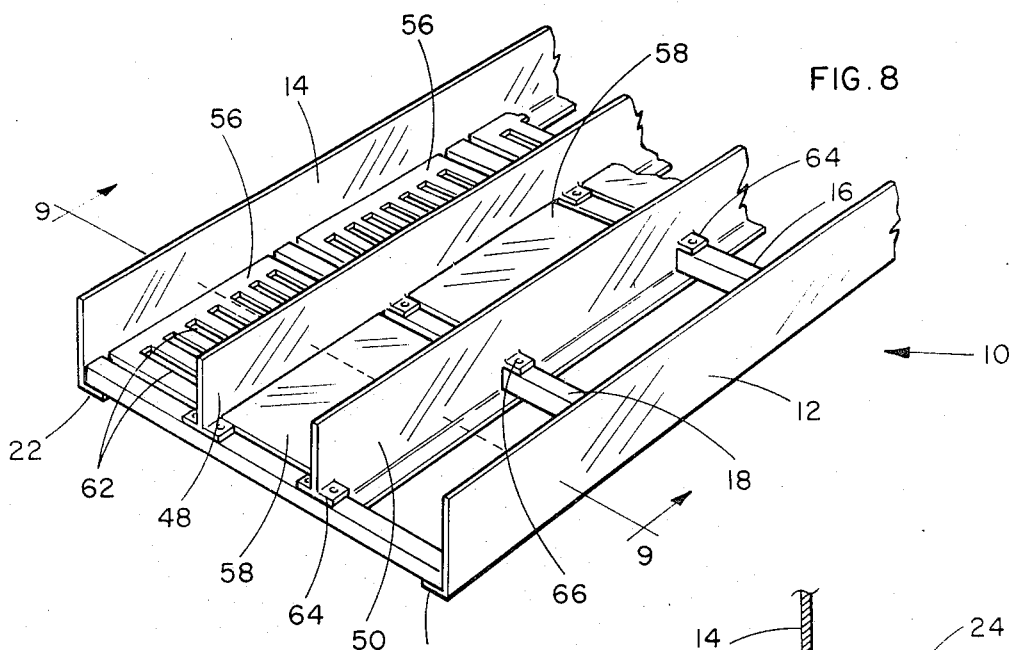
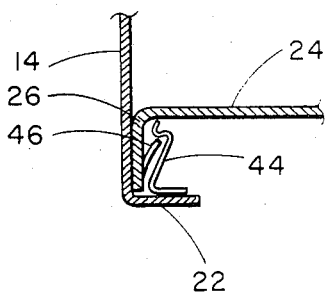
FIG.7
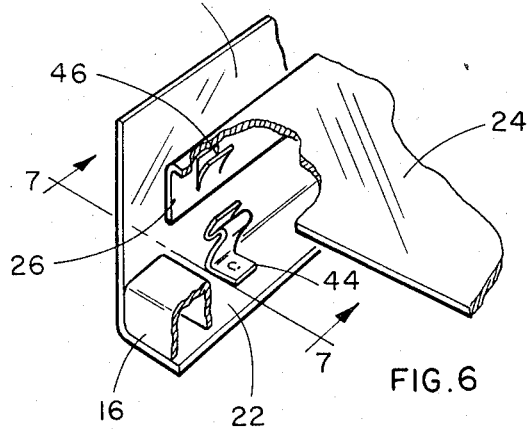
FIG.6
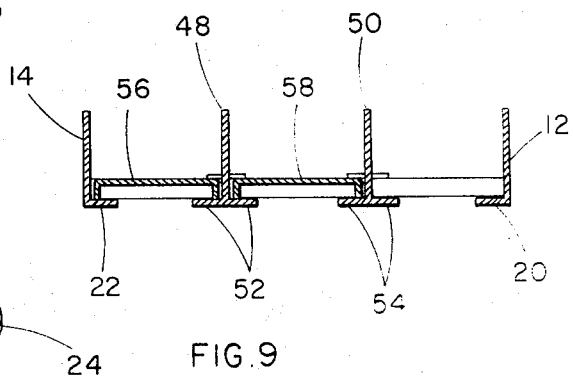
FIG.9
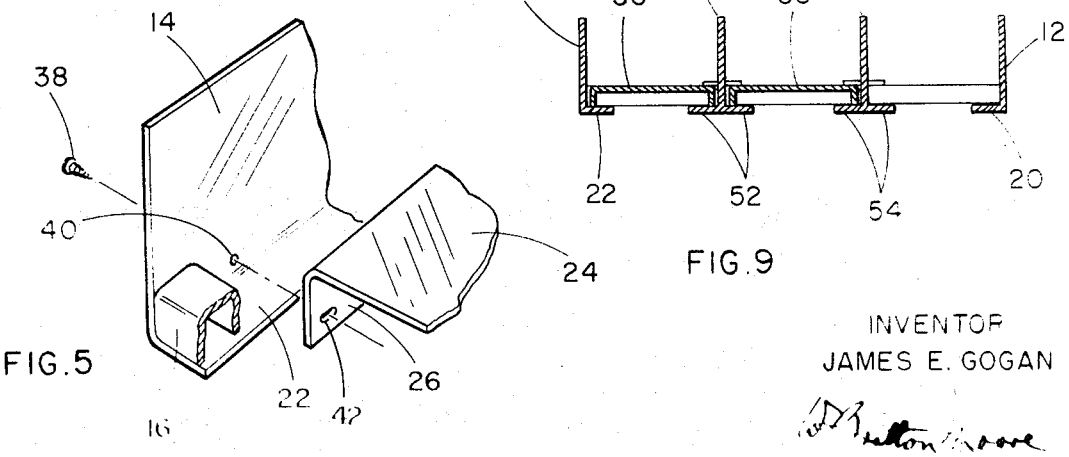
FIG.5
INVENTOR
JAMES E. GOGAN
ATTORNEY

MULTI-WAY CABLE TROUGHS

Extensive use is made during the installation of electrical cables and conduits in the construction of buildings, telephone exchanges and factories, of different types of cable-supporting troughs. These troughs usually have a bottom or floor portion which is disposed between two longitudinally parallel and upstanding side flanges.

One type of trough has a solid or imperforate bottom or floor portion on which the electric cable or cables lie. Another type of trough has openings or apertures in its bottom or floor portion to permit air to circulate through the apertures for the purpose of cooling the cable and so remove the heat generated by the passage of electric current through the cable. In yet another type of cable-supporting trough, known as the "ladder-type", the upstanding side flanges are rigidly interconnected by rungs or ribs on which the cables are supported.

When it is appreciated that all three types of trough are usually required in several different sizes, the extent to which a manufacturer and a distributor must provide and have on hand a large range of different troughs will readily be comprehended.

The principal object of the present invention is to provide a trough for supporting electric cables, which trough is adapted to be utilized as such as a ladder-type trough or which, by the simple insertion of cable-supporting modular panels, can be used as a ventilated or non-ventilated cable-supporting trough.

It is another object of the present invention to apply a modularization technique to the design and construction of cable-supporting troughs.

Yet another object in accordance with a preferred feature of the present invention is to provide a cable-supporting trough from which a cable-supporting modular panel may readily be omitted or removed so as to provide a cable-entry opening through the floor of the trough.

A further object in accordance with another preferred feature of the invention is to provide a cable-supporting trough which can, by the insertion of modular panels, be used to provide more than one type of cable-supporting trough within a single trough framework.

The primary object of the present invention is attained by the provision of a trough for supporting electric cables which comprises a pair of longitudinally parallel and upstanding side flanges which are mutually separated and rigidly interconnected by a plurality of longitudinally separated and transversely extending ribs having upwardly directed cable-supporting surfaces, said trough being provided with means for supporting a cable-supporting modular panel between said ribs in such a manner that a cable-supporting surface of said panel is substantially coplanar with said cable-supporting surfaces of said ribs.

The invention also embraces such a trough having a cable-supporting modular panel supported therein. The scope of the present invention also extends to embrace the combination of an electrical cable and a trough as hereinbefore defined and containing and supporting the cable.

Although the modular panels may be simply supported within the troughs of the invention, it will frequently be useful to provide means for securing the modular panels between the ribs. In this way, one or more panels may be omitted during installation of the trough so as to provide openings for the entry or exit of cables through the floor of the trough.

In accordance with a particularly useful feature of the invention, the troughs and modular panels may be designed so that a trough can be divided by longitudinal and upstanding trough-dividing flanges disposed between the side flanges and supported by the ribs to give a multi-functional trough having raceways of different types, for example, both ventilated and non-ventilated ones.

Other objects, features and advantages of the invention will become apparent as the following description of useful embodiments of the invention proceeds.

The invention will now be described merely by way of illustration with reference to the accompanying drawings in which:

FIG. 1 is a partial perspective view of one embodiment in accordance with the invention of a trough for supporting electric cables, FIG. 2 is a perspective view of an imperforate cable-supporting modular panel for use in conjunction with the trough of FIG. 1, FIG. 3 is a perspective view of a cable-supporting modular panel similar to that of FIG. 2 but additionally provided with a plurality of ventilating apertures through its cable-supporting surface, FIG. 4 is a partial perspective view of the trough of FIG. 1 showing cable-supporting modular panels of the type shown in FIG. 2 disposed therein, FIG. 5 is a fragmentary exploded perspective view illustrating one procedure for securing a cable-supporting modular panel in a trough according to the invention, FIG. 6 is a fragmentary exploded perspective view showing an alternative procedure for securing a cable-supporting modular panel within a trough, FIG. 7 is a vertical section along the line 7—7 of FIG. 6 showing the modular panel secured in the trough, FIG. 8 is a partial perspective view of a trough for supporting electric cables showing the provision in accordance with an additional feature of the invention of longitudinal and upstanding trough-dividing flanges; and FIG. 9 is a vertical section along the line 9—9 of FIG. 8.

Referring to FIG. 1, it will be seen that the trough generally indicated therein at 10 comprises a pair of longitudinally parallel and upstanding side flanges 12 and 14. These side flanges 12 and 14 are mutually separated and rigidly interconnected by a plurality of longitudinally separated and transversely extending ribs 16. Each of these ribs 16 has an upwardly directed cable-supporting surface 18.

In the embodiment illustrated in FIG. 1, each of the ribs 16 is rigidly secured, as for example by welding, to the upstanding side flanges 12 and 14 and to inwardly directed flanges 20 and 22 integrally formed with the side flanges 12 and 14 respectively.

In accordance with an essential feature of the invention, the longitudinal separation between two adjacent ribs 16 is approximately equal to, or an integral multiple of, the longitudinal length of a modular panel.

The trough shown in FIG. 1 can be used as such as a ladder-type cable trough. It can, however, in accordance with the primary essential feature of the invention, also be used as a trough for the ventilated or non-ventilated support of electric cables. It is to this end that the longitudinal spacing of the transverse ribs 16 is made approximately equal to, or an approximate integral multiple of, the longitudinal length of a modular panel.

One suitable form for a non-ventilated modular panel for use with the trough 10 of FIG. 1 is shown in FIG. 2. This panel generally indicated in FIG. 2 at 24 has a longitudinal length "A" approximately equal to the longitudinal separation between an adjacent pair of ribs 16. The transverse width of the panel 24 is approximately equal to the transverse separation of the side flanges 12 and 14. The modular panel 24 is provided along each of its longitudinal edges with an integrally formed downwardly directed flange 26 which engages inwardly directed flanges 20 and 22 to support the panel 24 so that its cable-supporting surface 28 is substantially coplanar with the cable-supporting surfaces 18 of the ribs 16. Although reference has already been made to the fact that the longitudinal length of a modular panel, such as panel 24, will be approximately equal to, or an approximate integral sub-multiple of, the longitudinal separation of an adjacent pair of transverse ribs 16, it will be appreciated that the longitudinal lengths of such panels will normally be slightly smaller than such values to permit easy insertion of the panels into the trough. Similar considerations apply to the transverse width of the panels. It is for this reason that these dimensions have been referred to hereinbefore as being approximately equal.

One suitable form for a ventilated modular panel for use with the trough 10 of FIG. 1 is indicated generally at 30 in FIG. 3. As was the case for the panel 24 of FIG. 2, the panel 30 has a longitudinal length "A" approximately equal to the longitudinal separation of an adjacent pair of ribs 16, or to an approximate integral sub-multiple of such separation. Similarly, as for the panel 24, the panel 30 of FIG. 3 is provided along each of its longitudinal edges with downwardly directed flanges 32 which are provided to engage the inwardly directed flanges 20 and 22 when the panel 30 is disposed within the trough 10. In this way, the uppermost cable-supporting surface 34 of the panel 30 is substantially coplanar with the cable-supporting surfaces 18 of the ribs 16 when the panel 30 is disposed within the trough 10.

It will also be appreciated that, although the panels 24 and 30 have been described as each having a longitudinal length "A" approximately equal to the longitudinal separation between an adjacent pair of ribs 16, such panels may be formed with longitudinal lengths which are apprxomately integral submultiples of such longitudinal separation. In such a case, a corresponding integral number of panels would be inserted between an adjacent pair of ribs 16.

It will also be appreciated that the provision of flanges 26 and 32 is only one manner for ensuring that the cable-supporting surfaces 28 and 34 of the panels 24 and 30 respectively are substantially coplanar with the upper surfaces 18 of the ribs 16. Alternatively, it could be equally effective to utilize panels having a thickness equal to the height of the ribs 16 or to support the panels on inwardly directed flanges disposed above the flanges 20 and 22.

It will further be appreciated that the provision of seven transverse ventilating apertures 36 in the panel 30 is merely given by way of illustration and that any appropriate number of apertures of any appropriate shape can be provided in such a ventilated panel.

As previously indicated, the cable-supporting panels are usefully secured within the trough. Two typical procedures for effecting such securement are shown in FIGS. 5, 6 and 7. In the system shown in FIG. 5, the panel 24 is secured in position by means of a self-tapping screw 38 which is driven through a hole 40 provided for this purpose in the upstanding side flange 14. The screw 38 is also received in a slotted opening 42 in the flange 26 of the panel 24. Any number of such screws may be used to secure each modular panel.

The alternative procedure shown in FIGS. 6 and 7 involves the provision of a spring clip fastener 44 secured to the flange 22. An upwardly and inwardly directed tongue 46 is provided on the inner surface of the flange 26 for engagement by the spring clip fastener 44 as shown in FIG. 7.

Referring now to FIGS. 8 and 9, it will be seen that the trough 10 can be divided into a plurality of longitudinal cable-supporting sections by the use of longitudinal and upstanding flanges. In the construction specifically shown in the drawings, the trough 10 is divided into three longitudinal sections by two upstanding flanges 48 and 50. Each of these flanges 48 and 50 is in the form of an inverted "T" so as to provide transversely extending flanges 52 and 54 respectively to support the modular panels 56 and 58. It will be noted that the panels 56 and 58 shown in FIGS. 8 and 9 each have a width when measured together with the thickness of the respective one and flanges 48 and 50 are approximately an integral sub-multiple of the transverse width of the trough 10.

As will be seen from FIG. 8, the left-hand section of the trough 10 is provided with ventilated panels 56 having transverse apertures 62. The central section is provided with non-ventilated panels 58 while the right-hand section is provided with no panels so forming a ladder-type section.

In order to prevent accidental displacement of the flanges 48 and 50 from the trough 10, these flanges are provided with transversely extending tongues 64 which are secured to the ribs 16 suitably by self-tapping screws 66. As in the case of the construction of FIGS. 5, 6 and 7, the panels 56 and 58 may usefully be provided with spring-clip fasteners, such as fasteners 44, to secure these panels within the trough 10.

By securing the panels in the trough in a removable manner, the invention permits the removal of one or more modular panels to provide openings through which cables may enter or leave the trough.

The troughs of the present invention, as well as the modular panels and the trough-dividing flanges, can be manufactured from a wide range of materials. They may, for instance, be fabricated from metals such as steel and aluminum. They may also be formed from suitable plastics materials.

What I claim as my invention is:

1. A trough for supporting electric cables which comprises a pair of longitudinally parallel and upstanding side rails which are mutually separated and rigidly and permanently interconnected by a plurality of transversely extending ribs having upwardly directed top surfaces, adjacent said ribs being mutually longitudinally separated by distances which are integral multiples of a predetermined fixed length and said trough being provided with means for detachable engagement with co-operating means on a modular panel for detachable detachably securing such a modular panel within said trough between said side rails thereof, whereby such a modular panel can be so positioned between said ribs and secured within said trough and readily detached and removed from said trough without mutual detachment of said ribs and said side rails.

2. A trough as claimed in claim 1 in which each of said side rails has integrally formed therewith an inwardly directed lip adapted supportingly to engage a downwardly directed edge flange integrally formed with a modular panel of the type specified.

3. A trough as claimed in claim 2 in which said means on said trough for detachable engagement with co-operating means on a modular panel of the type specified for detachably securing such a modular panel between said ribs are provided on the inner surfaces of said side rails to co-operate with means provided on the downwardly directed edge flanges of such a modular panel disposed between said ribs and supported on said inwardly directed lips of said side rails for the purpose of detachably securing such a panel between said ribs.

4. A trough as claimed in claim 1 in which said means on said trough for detachable engagement with co-operating means on a modular panel for detachably securing such a modular panel between said ribs is adapted detachably to secure such a panel so that a top surface thereof is substantially coplanar with said top surfaces of said ribs.

5. A trough for supporting electric cables and comprising a pair of longitudinally parallel and upstanding side rails which are mutually separated and rigidly and permanently interconnected by a plurality of transversely extending ribs having upwardly directed top surfaces, adjacent said ribs being mutually longitudinally separated by distances which are integral multiples of a predetermined fixed length, and a modular panel removably supported within said trough between said side rails thereof whereby said panel can readily be removed upwardly from said trough without detachment of said ribs from said side rails.

6. A trough as claimed in claim 5 in which said modular panel is removably supported between said ribs so that a top surface of said panel is substantially coplanar with said top surfaces of said ribs.

7. A trough as claimed in claim 5 in which said modular panel is detachably secured in said trough between said ribs thereof whereby said panel can readily be detached and removed from said trough without detachment of said ribs from said side rails.

8. A trough as claimed in claim 7 in which said modular panel is substantially imperforate.

9. A trough as claimed in claim 7 in which said modular panel is provided through its top surface with at least one ventilating aperture.

10. A trough for supporting electric cables and comprising a pair of longitudinally parallel and upstanding side rails, each of which is integrally formed with an inwardly directed lip and which are mutually separated and rigidly and permanently interconnected by a plurality of transversely extending ribs having upwardly directed top surfaces, adjacent said ribs being mutually longitudinally separated by distances which are integral multiples of a predetermined fixed length, and a modular panel having downwardly directed edge flanges supportingly engaged by said lips of said side rails between said ribs with a top surface of said panel substantially coplanar with said top surfaces of said ribs, whereby said panel can readily be removed from said trough without detachment of said ribs from said side rails.

11. A trough as claimed in claim 10 in which each of said side rails is provided in its inner surface with means adapted to cooperate with means provided on said downwardly directed edge flanges of said modular panel for the purpose of removably securing said panel between said ribs.

12. A trough for supporting electric cables and comprising a pair of longitudinally parallel and upstanding side rails which are mutually separated and rigidly and permanently interconnected by a plurality of transversely extending ribs having upwardly directed top surfaces, adjacent said ribs being mutually longitudinally separated by distances which are integral multiples of a predetermined fixed length, a modular panel removably supported between said ribs with a top surface of said panel substantially coplanar with said top surfaces of said ribs, whereby said panel can readily be removed from said trough without detachment of said ribs from said side rails, and at least one longitudinal and upstanding trough-dividing partition removably disposed between said side rails and supported by said ribs.

13. A trough as claimed in claim 12 which comprises two said longitudinal and upstanding trough-dividing partitions removably disposed between said side rails and supported by said ribs transversely to divide said trough into three sections, a plurality of imperforate modular panels removably supported between said ribs in one of said sections with top surfaces of said panels substantially coplanar with said top surfaces of said ribs, and a plurality of apertured modular panels removably supported between said ribs in another of said sections.

14. A trough as claimed in claim 5 which additionally comprises at least one longitudinal and upstanding trough-dividing partition removably disposed between said side rails and supported by said ribs.

* * * * *